US010333301B2

(12) United States Patent
Gubba Ravikumar

(10) Patent No.: US 10,333,301 B2
(45) Date of Patent: Jun. 25, 2019

(54) TRANSIENT SIMULATION MODELING FOR DYNAMIC REMEDIAL ACTION SCHEMES USING REAL-TIME PROTECTION SETTING UPDATES

(71) Applicant: Schweitzer Engineering Laboratories, Inc., Pullman, WA (US)

(72) Inventor: Krishnanjan Gubba Ravikumar, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 86 days.

(21) Appl. No.: 15/587,179

(22) Filed: May 4, 2017

(65) Prior Publication Data
US 2018/0323611 A1    Nov. 8, 2018

(51) Int. Cl.
  *G05D 3/12*    (2006.01)
  *H02J 3/00*    (2006.01)
  *H02J 13/00*   (2006.01)
  *G05B 17/02*   (2006.01)

(52) U.S. Cl.
  CPC ............... *H02J 3/00* (2013.01); *G05B 17/02* (2013.01); *H02J 13/0017* (2013.01); *H02J 2003/007* (2013.01)

(58) Field of Classification Search
  CPC .................................................. H02H 3/006
  USPC .......................................................... 700/292
  See application file for complete search history.

(56) References Cited

U.S. PATENT DOCUMENTS

| 5,160,926 | A | 11/1992 | Schweitzer, III |
| 5,680,324 | A | 10/1997 | Schweitzer, III |
| 5,793,750 | A | 8/1998 | Schweitzer, III |
| 6,121,886 | A | 9/2000 | Andersen |
| 6,380,949 | B2 | 4/2002 | Thomas |
| 6,388,901 | B2 | 5/2002 | Sato |
| 6,662,124 | B2 | 12/2003 | Schweitzer |
| 6,671,635 | B1 | 12/2003 | Forth |

(Continued)

FOREIGN PATENT DOCUMENTS

WO    2013017363    2/2013

OTHER PUBLICATIONS

Carl B. Hauser, David E. Bakken, Anjan Bose, A Failure to Communicate, IEEE Power and Energy Magazine, Mar./Apr. 2005.

(Continued)

*Primary Examiner* — Suresh Suryawanshi
(74) *Attorney, Agent, or Firm* — Justin K. Flanagan; Bradley W. Schield

(57) ABSTRACT

Protective IEDs in an electrical power system, such as distributed controllers, may periodically or in real-time communicate updated protection settings to a wide-area controller, such as a coordination controller, that defines and/or implements a remedial action scheme to protect the electrical power system. The wide-area controller may utilize real-time protection setting information from a plurality of protective IEDs to perform dynamic transient model simulations based on (1) the current topology of the power system, (2) real-time measurements from the system, and (3) the updated, real-time protection settings of various IEDs within the system. The results of the updated transient model simulations may be used to dynamically adjust the remedial actions scheme of the wide-area controller.

20 Claims, 7 Drawing Sheets

(56) References Cited

U.S. PATENT DOCUMENTS

| | | |
|---|---|---|
| 6,757,282 B1 | 6/2004 | Ofek |
| 6,795,789 B2 | 9/2004 | Vandiver |
| 6,871,224 B1 | 3/2005 | Chu |
| 6,944,555 B2 | 9/2005 | Blackett |
| 6,947,269 B2 | 9/2005 | Lee |
| 6,957,158 B1 | 10/2005 | Hancock |
| 6,961,641 B1 | 11/2005 | Forth |
| 6,990,395 B2 | 1/2006 | Ransom |
| 7,080,142 B2 | 7/2006 | Galloway |
| 7,174,258 B2 | 2/2007 | Hart |
| 7,188,003 B2 | 3/2007 | Ransom |
| 7,231,003 B2 | 6/2007 | Lee |
| 7,415,368 B2 | 8/2008 | Gilbert |
| 7,415,725 B2 | 8/2008 | Henneberry |
| 7,421,531 B2 | 9/2008 | Rotvold |
| 7,447,760 B2 | 11/2008 | Forth |
| 7,457,872 B2 | 11/2008 | Aton |
| 7,460,347 B2 | 12/2008 | Schweitzer, III |
| 7,460,590 B2 | 12/2008 | Lee |
| 7,463,467 B2 | 12/2008 | Lee |
| 7,666,004 B2 | 2/2010 | Johnson |
| 7,693,607 B2 | 4/2010 | Kasztenny |
| 7,870,595 B2 | 1/2011 | Finney |
| 7,899,619 B2 | 3/2011 | Petras |
| 7,987,059 B2 | 7/2011 | Gong |
| 8,082,367 B2 | 12/2011 | Etheridge |
| 8,260,579 B2 | 9/2012 | Bickel |
| 9,383,735 B2 | 7/2016 | Schweitzer |
| 9,568,516 B2 | 2/2017 | Gubba Ravikumar |
| 2001/0022734 A1 | 9/2001 | Sato |
| 2002/0173927 A1 | 11/2002 | Vandiver |
| 2004/0010350 A1* | 1/2004 | Lof ............ H02J 3/24 700/292 |
| 2004/0138834 A1 | 7/2004 | Blackett |
| 2004/0138835 A1 | 7/2004 | Ransom |
| 2004/0193329 A1 | 9/2004 | Ransom |
| 2005/0138111 A1 | 6/2005 | Aton |
| 2005/0138432 A1 | 6/2005 | Ransom |
| 2005/0144437 A1 | 6/2005 | Ransom |
| 2005/0280965 A1 | 12/2005 | Lee |
| 2006/0155908 A1 | 7/2006 | Rotvold |
| 2006/0230394 A1 | 10/2006 | Forth |
| 2007/0067132 A1* | 3/2007 | Tziouvaras ........ H02H 3/006 702/122 |
| 2007/0096765 A1 | 5/2007 | Kagen |
| 2007/0133724 A1 | 6/2007 | Mazereeuw |
| 2008/0052435 A1 | 2/2008 | Norwood |
| 2008/0075019 A1 | 3/2008 | Petras |
| 2008/0162930 A1 | 7/2008 | Finney |
| 2009/0088990 A1* | 4/2009 | Schweitzer, III .. G01R 19/2513 702/58 |
| 2009/0254655 A1 | 10/2009 | Kidwell |
| 2010/0204851 A1 | 8/2010 | Yuen |
| 2011/0035065 A1 | 2/2011 | Schweitzer |
| 2011/0066301 A1 | 3/2011 | Donolo |
| 2011/0282507 A1* | 11/2011 | Oudalov ............ H04B 3/54 700/292 |
| 2012/0226386 A1 | 9/2012 | Kulathu |
| 2013/0030599 A1 | 1/2013 | Milosevic |
| 2013/0035800 A1 | 2/2013 | Kulathu |
| 2014/0001847 A1 | 1/2014 | Khandelwal |
| 2014/0100702 A1 | 4/2014 | Schweitzer |
| 2014/0293494 A1 | 10/2014 | Allen et al. |
| 2016/0190790 A1* | 6/2016 | Oudalov ............ H02H 3/006 361/66 |
| 2016/0246666 A1 | 8/2016 | Gubba Ravikumar |

OTHER PUBLICATIONS

Edmund O. Schweitzer, III, David E. Whitehead, Real-Time Power System Control Using Synchrophasors, Sep. 11, 2007.

Edmund O. Schweitzer, III, David E. Whitehead, Real-World Synchrophasor Solutions, Sep. 17, 2008.

John C. Eidson, John Tengdin, IEEE-1588 Standard for a Precision Clock Synchronization Protocol for a Networked Measurement and Control System and Applications in the Power Industry, 2003.

M. Kezunovic, G. Latisko, Automated Monitoring Functions for Impoved Power System Operation and Control, IEEE, 2005.

PCT/US2010/045086, Patent Cooperation Treaty, International Search Report and Written Opinion of the International Searching Authority, dated Oct. 8, 2010.

ScadaWorks, SCADA System Development Tools, Technical Reference Manual, 2003.

W.J. Ackerman, The Impact of IEDs on the Design of Systems Used for Operation and Control of Power Systems, Power System Management and Control, Apr. 17-19, 2002.

Wobshal, Network Sensors for the Smart Grid, Sensors Expo, 2010.

PCT/US2013/062650, Patent Cooperation Treaty, International Search Report and Written Opinion of the International Searching Authority, dated Jan. 7, 2014.

PCT/US2018/030120, Patent Cooperation Treaty, International Search Report and Written Opinion of the International Searching Authority, dated Jul. 25, 2018.

Gao. "Remedial Action Schemes Derived from Dynamic Security Assessment." Mar. 16, 2012. Retrieved from <https://www.diva-portal.org/smash/get/diva2:510598/FULLTEXT01.pdf> entire document.

Madami et al. "Design and Implementation of Wide Area Special Protection Schemes." In: 2004 57th Annual Conference for Protective Relay Engineers. Apr. 1, 2004. Retrieved from <https://www.gegridsolutions.com/smartgrid/Apr06/Wide_Area_Special_Protection_Schemes.pdf> entire document.

North American Electric Reliability Corporation (NERC). "Special Protection Systems (SPS) and Remedial Actions Schemes (RAS): Assessment of Definition , Regional Practices, and Application of Related Standards." Apr. 2013. Retrieved from <https://www.nerc.com/pa/Stand/Prjct201005_2SpclPrtctnSstmPhs/System_Protection_and_Control_Subcommittee_SPCS_20_SAMS-SPCS_SPS_Technic_02182014.pdf> entire locument.

* cited by examiner

TRANSIENT SIMULATION MODELING FOR DYNAMIC REMEDIAL ACTION SCHEMES USING REAL-TIME PROTECTION SETTING UPDATES

TECHNICAL FIELD

This disclosure relates to distributed coordinated wide-area control of electric power delivery systems. More particularly, this disclosure relates to protective relays and/or other control devices receiving real-time protection setting updates to allow for dynamic remedial action schemes based on updated transient simulation modeling.

BRIEF DESCRIPTION OF THE DRAWINGS

This disclosure includes illustrative embodiments that are non-limiting and non-exhaustive. Reference is made to certain of such illustrative embodiments that are depicted in the figures described below.

FIG. 6 illustrates one method of providing a coordination controller with real-time, updated protection settings along with measurement data, state data, and the like.

DETAILED DESCRIPTION

Figure 1:
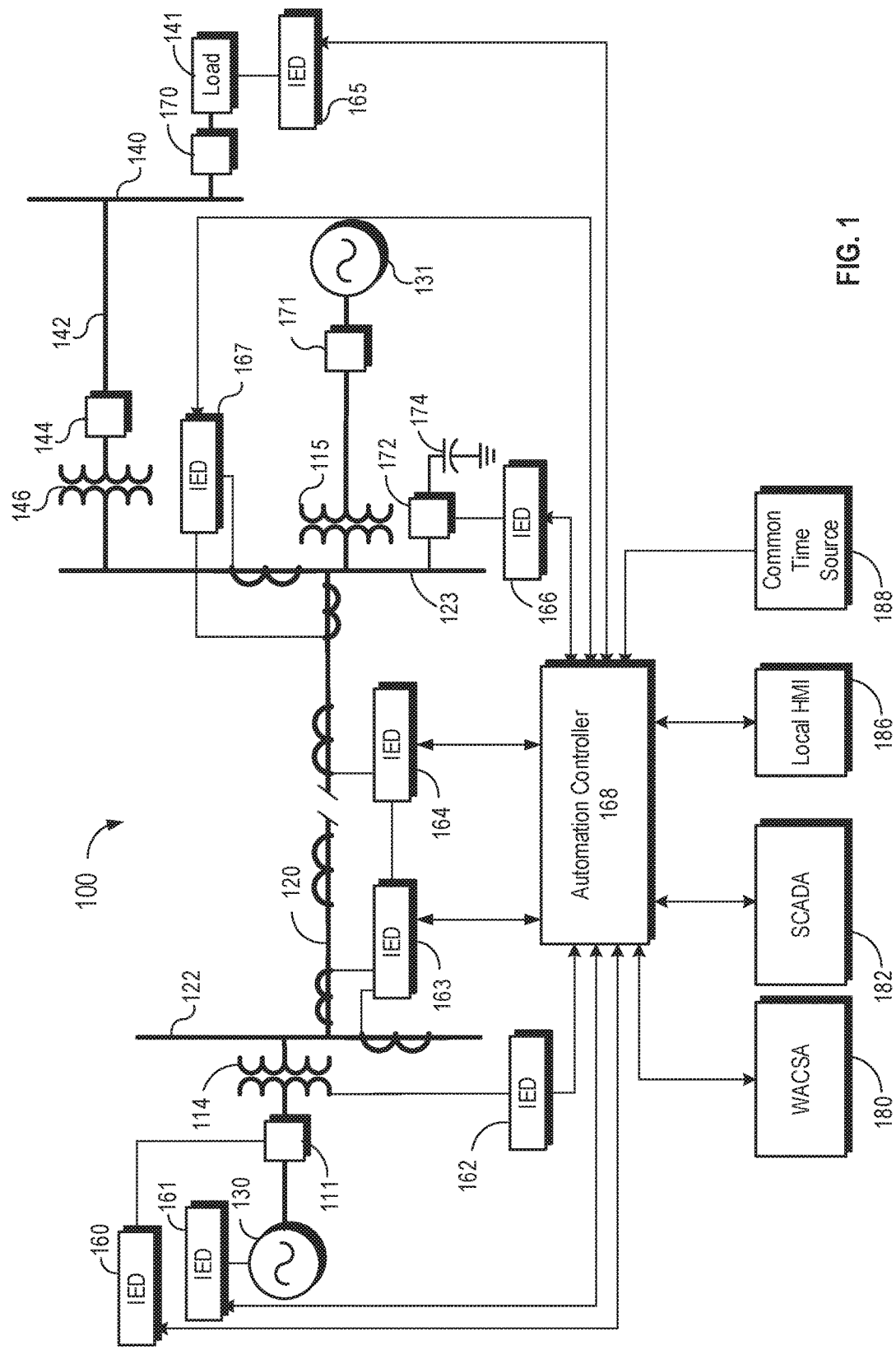
FIG. 1 is a simplified one-line diagram of one embodiment of an electric power delivery system.

Electrical power generation and delivery systems generate, transmit, and distribute electrical energy to loads. Electrical power generation and delivery systems may include equipment such as electrical generators, electrical motors, power transformers, power transmission and distribution lines, circuit breakers, switches, buses, voltage regulators, capacitor banks, and the like. Such equipment may be monitored, controlled, automated, and/or protected using intelligent electronic devices (IEDs) that receive electric power delivery system information from the equipment, make decisions based on the information, and provide monitoring, control, protection, and/or automation outputs to the equipment.

An electric power system may include local protective devices to protect local components and portions of the electric power system. The local protective devices, in some instances, may protect a single component, such as a generator, or may be associated with a specific feeder or distribution branch. Local protective devices may provide measurement data to a regional or distributed protective device that may protect a plurality of local components or a larger portion of the electric power system. These regional or distributed protective devices may be referred to as wide-area protective devices in that they provide protection to a wider area than a local protection component. Regional or distributed protective devices may communicate with and control local protective devices to protect the wide area within their purview. Still higher level protective devices may receive measurement data and/or calculations from a plurality of regional or distributed protective devices to make wide-area control decisions for multiple regions and/or distributed protective devices. The number of levels of protective devices may depend on a particular application but is not limited to two or three. Each level of protection may control one or more sub-levels of protective devices.

Each protective device, such as a circuit breaker or switch, may be controlled by an external IED or include an integrated IED. For example, protective devices may be incorporated directly into power system equipment. For example, a generator may include an IED (which may be embodied as a simple electronic circuit, or may include a processor and memory for more complex operations) to control integrated protective devices such as breakers, voltage regulators, current regulators, frequency control devices, etc. A breaker may have an integrated IED to determine when to open and may also be in communication with higher lever IEDs that may instruct it to open as well. Each protective device, groups of protective devices, and/or the IEDs controlling protective devices may have adjustable protection settings.

In some embodiments, the protection settings of a protective IED are user-selectable. Coordination controllers, as described herein, may utilize the state of electric power system, current measurement values, and protection settings of downstream IEDs (such as distributed controllers) to determine a remedial action scheme (RAS). The RAS may define actions to be taken in response to various potential future conditions or events of the electric power system.

For example, a station controller may determine a RAS for a plurality of generators, breakers, distribution lines, and various loads. The RAS may define actions to be implemented if a generator were to lose power or otherwise go offline. The RAS may use a transient simulation model to determine the consequences of various events and actions. For example, a transient simulation model may indicate that if one of the generators were to go offline, that the other generators can continue to supply power to all the loads connected to the system, so long as the total load does not exceed a predetermined threshold. Above that threshold, the transient simulation model may indicate that load shedding may be necessary to avoid cascading failures. A RAS is not limited to the above examples, but rather may include any of a wide variety of actions to protect a wide variety of components and portions of an electric power system.

For example, a RAS may define actions to be taken in response to predetermined system conditions. The actions defined by the RAS may include, but are not limited to: curtailing or tripping generation or other sources; curtailing or tripping load; reconfiguring a system to meet specific reliability standards; modifying a topology (including adding generation, removing generation, adding load, and removing load) to maintain stability, system voltage, and/or acceptable power flow levels; prevent cascading failures; protect critical components of a system; protect and/or maintain power to critical loads; and/or the like. Many aspects of the RAS may be based on transient modeling of the behavior of the electric power system. The transient model of the electric power system may be highly dependent on the protection settings (e.g., set points) of various protective IEDs and/or protective devices within the system. In systems in which the protection settings may be user-selected and/or updated, a station controller, regional controller, centralized controller, or coordination controller implementing a RAS may be notified of the updated protection settings. A regional controller may provide coordinated protection for region. A centralized controller or multi-regional controller may provide higher level coordinated protection to multiple regions via a plurality of regional coordination controllers. The controller may use the updated protection settings to update the transient model simulations. The updated transient model simulations may warrant modification or updates to the RAS.

In some embodiments, adaptive protection systems may be utilized within the electric power system. For example, breakers, generators, switches, and the like may be protected with protective IEDs that adapt or modify their protection settings based on current system conditions. In some embodiments, adaptive protective IEDs may adjust protection settings in real time based on the instantaneous state of the electric power system.

Transient modeling using updated protection settings may allow for enhanced RASs to better protect electric power systems. As a simplified example, a wide-area controller may define a RAS that includes actions to be taken if a 50 Hz transmission line feeding a microgrid loses power. The RAS may be based on transient modeling of the potential event. Optional actions may include shedding load or ramping up a generator. The transient modeling for a system, based on real-time system conditions and existing topologies, may reveal that if the generator is ramped up, it will result in an overfrequency condition of 51.5 Hz. IED protection settings for the generator may specify an overfrequency upper setting of 52 Hz. Accordingly, the RAS may indicate that the action to be taken if the transmission line loses power is to ramp up the generator.

However, the protective IED for the generator may dynamically update the protection settings for the generator based on system conditions. For instance, the protective IED may update the overfrequency upper limit to be 51 Hz. The protective IED may notify the wide-area controller, which may in turn update its transient model simulations. Based on the new simulations, the wide-area controller may determine that the action to be taken if the transmission line loses power is to shed some of the load on the system. Absent, continual or periodic protection setting updates to the wide-area controller, the wide-area controller may define and implement RASs based on erroneous protection settings that may result in cascading failures or other problems.

For instance, in the example above, if the generator were to be ramped up and driven to 51.5 Hz, the generator's protective IED would open a breaker to disconnect the generator from the electric power system. Thus, failure of the transmission line may have resulted in a cascaded failure of the generator per the RAS's reliance on transient simulations based on erroneous protection settings.

As electric power systems increasingly utilize renewable power sources, adaptive protection settings may become more and more common, especially given the variation in power output of some types of renewable power sources. By providing real-time or periodic protection setting updates to wide-area controllers, the wide-area controllers can conduct dynamic transient simulations based on updated protection settings to ensure that RASs define actions that will result in the expected outcomes.

In various embodiments of the systems and methods described herein, protective IEDs may communicate real-time protection settings (e.g., continually, on a periodic basis, or in response to changes) to a wide-area controller implementing a RAS. The wide-area controller may utilize the real-time protection setting information from a plurality of protective IEDs to perform dynamic transient model simulations based on (1) the current topology of the power system, (2) real-time measurements from the system, and (3) the updated, real-time protection settings of various IEDs within the system.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc. that perform one or more tasks or implement abstract data types.

A software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are generally designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. Well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates a simplified diagram of an example of an electric power delivery system 100. The systems and methods described herein may be applied and/or implemented in the system electric power delivery system 100 illustrated in FIG. 1. Although illustrated as a one-line diagram for purposes of simplicity, an electrical power delivery system 100 may be configured as a three-phase power system. The electric power delivery system 100 may include, among other things, electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. Additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. Other equipment, machines, and connected devices may be included as well, as appreciated by one of skill in the art.

Typically, electric power delivery systems have been reliable. However, the possibility of events exists that can drive electric power delivery systems into an unstable state. Generally, instabilities include, for example, rotor angle instability, voltage collapse, frequency deviation, equipment failure, faults, and instability due to structural limitations of the electric power delivery system.

Modern electric power delivery systems (which may include electric power generation systems, transmission systems, distribution systems, and consumption systems) are controlled using IEDs. FIG. 1 illustrates several IEDs 160-167 that may control the one or more protective devices (e.g., protective elements) of the electric power delivery system. As described above, an IED may be any processor-based device that controls monitored equipment within an electric power delivery system (e.g., system 100) or may be a circuit integrated within equipment. IEDs may obtain and/or derive a state of the electric power delivery system. The state may include equipment status, measurements, and/or derived or calculated values. In some embodiments, the IEDs 160-167 may gather equipment status from one or more pieces of monitored equipment (e.g., generator 130).

Equipment status may relate to the status of the monitored equipment, and may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like.

With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

IEDs may also determine a protection or controller condition using equipment status, measurements, and/or derived values, applied to an IED model. The protection or controller condition may depend on protection settings of the IED and/or associated protective devices. The controller condition may include, for example, a state of the IED protection, automation, control, or metering elements, encroachment timers, an integrating over-current integration position, pickup counts for enabling a release of a trip signal, and the like.

IEDs may be used to control various aspects of the electric power delivery system. To this end, they may include protection elements such as, for example, an instantaneous overcurrent element; an inverse-time overcurrent element; a thermal element; a reactive power threshold; a distance element; a current differential element; a load encroachment element; an impedance characteristic; a volts/Hz characteristic; an undervoltage element; a directional element; a negative sequence current element; a loss of excitation element; a negative sequence voltage element; an overvoltage element; a ground fault element; a high-impedance fault element; an underfrequency element; an overfrequency element; and the like.

Furthermore, IEDs may include control elements, related to electric power delivery system equipment. Accordingly, an IED may be configured as a reactive power controller, a capacitor bank controller, a transformer tap changing controller, a generator over-excitation limit controller, a governor controller, a power system stabilizer controller, a shunt reactor controller, a DC line controller, an inverter controller, and the like. It should be noted that a single IED may include one or more protection elements and/or control elements.

According to certain embodiments, IEDs 160-167 may issue control instructions to the monitored equipment in order to control various aspects relating to the monitored equipment. Typical control actions may be described as being in one of two categories: namely, discontinuous control, and continuous control. Protective control instructions may be based on protection settings of the IED. The protection settings of the IED may be manually entered, based on fault current studies, and/or dynamically adjusted based on instantaneous system conditions (e.g., from measured data).

Discontinuous control actions may be described as modifying a topology of the electric power delivery system. Some examples of discontinuous control actions include: opening a breaker which disconnects a generator; opening a breaker which sheds load; opening a breaker to remove a component when the component, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor.

Continuous control actions may be described as control actions that do not modify a topology of the electric power delivery system. Examples of continuous control actions include: adjusting a set-point on a governor to limit the power output of a synchronous machine so that it does not exceed the safe operating limits; simultaneously adjusting set-points of other synchronous machines so that they pickup the new load; and, adjusting a voltage regulation set-point of an automatic voltage regulator such that a voltage at a more distant point in the power system does not exceed its maximum or minimum voltage threshold.

As described above, wide-area controllers may utilize transient model simulations to develop RAS to be implemented in response to system events. Any of the above discontinuous or continuous control actions may be part of the RAS developed by a wide-area controller. IEDs within the area controlled by a wide-area controller may continuously, upon being changed, periodically, or on demand provide updated protection settings to the wide-area controller.

As mentioned above, IEDs may include an IED model which may include, for example, protection and/or control logic, IED characteristics, elements, thresholds, settings, and the like. The IED may apply equipment status, measurements, and/or derived values to the IED model to determine a controller condition and/or control instructions. As described above, control instructions may be continuous or discontinuous, and may include commands such as breaker trip, breaker close, recloser open or close, tap up, tap down, exciter voltage control, inverter control, and the like.

For example, an IED may include an inverse-time overcurrent element, and may derive current magnitudes of a conductor from current measurements thereof. The IED may apply the current magnitudes to the inverse-time overcurrent element to determine the time for which a current of a certain magnitude must persist before issuing an open (or trip) command to a circuit breaker. Accordingly, the IED may apply equipment status, measurements, and/or derived values to an IED model to determine a controller condition and/or a control instruction.

An IED (e.g., IED 160) may be in communication with a circuit breaker (e.g., breaker 111), and may send an instruction to open and/or close the circuit breaker, thus connecting or disconnecting a portion of a power system. In another example, an IED may be in communication with a recloser and control reclosing operations. In another example, an IED may be in communication with a voltage regulator and instruct the voltage regulator to tap up and/or down. Information of the types listed above, or more generally, information or instructions directing an IED or other device or equipment to perform a certain action, may be generally referred to as control instructions or protective instructions that define a protective action to be implemented.

IEDs 160-167 may be communicatively linked using a data communications network, and may further be communicatively linked to a central monitoring system, such as a supervisory control and data acquisition (SCADA) system 182, and/or a wide area control and situational awareness (WACSA) system 180. The SCADA system 182, the automation controller 168, and/or the WACSA system 180 may utilize transient model simulations based on the topology of the power system, measurement data, and updated protection settings of various IEDs to develop a dynamic RAS. The RAS may be utilized to protect the electric power system as a whole, protect specific components therein, and/or minimize or eliminate potential cascading failures.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like.

IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, wide-area controller, or access controller. In various embodiments, the automation controller 168 may be embodied as the SEL-2020, SEL-2030, SEL-2032, SEL-2240, SEL-3332, SEL-3378, SEL-3530, SEL-3505, or SEL-3555 RTAC available from Schweitzer Engineering Laboratories, Inc. of Pullman, Wash. Examples of automation controllers are also described in U.S. Pat. Nos. 5,680,324, 7,630,863, and U.S. Pat. No. 9,401,839, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., the electric generator 130 or the breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source 188 (e.g., a clock). In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

Figure 2:
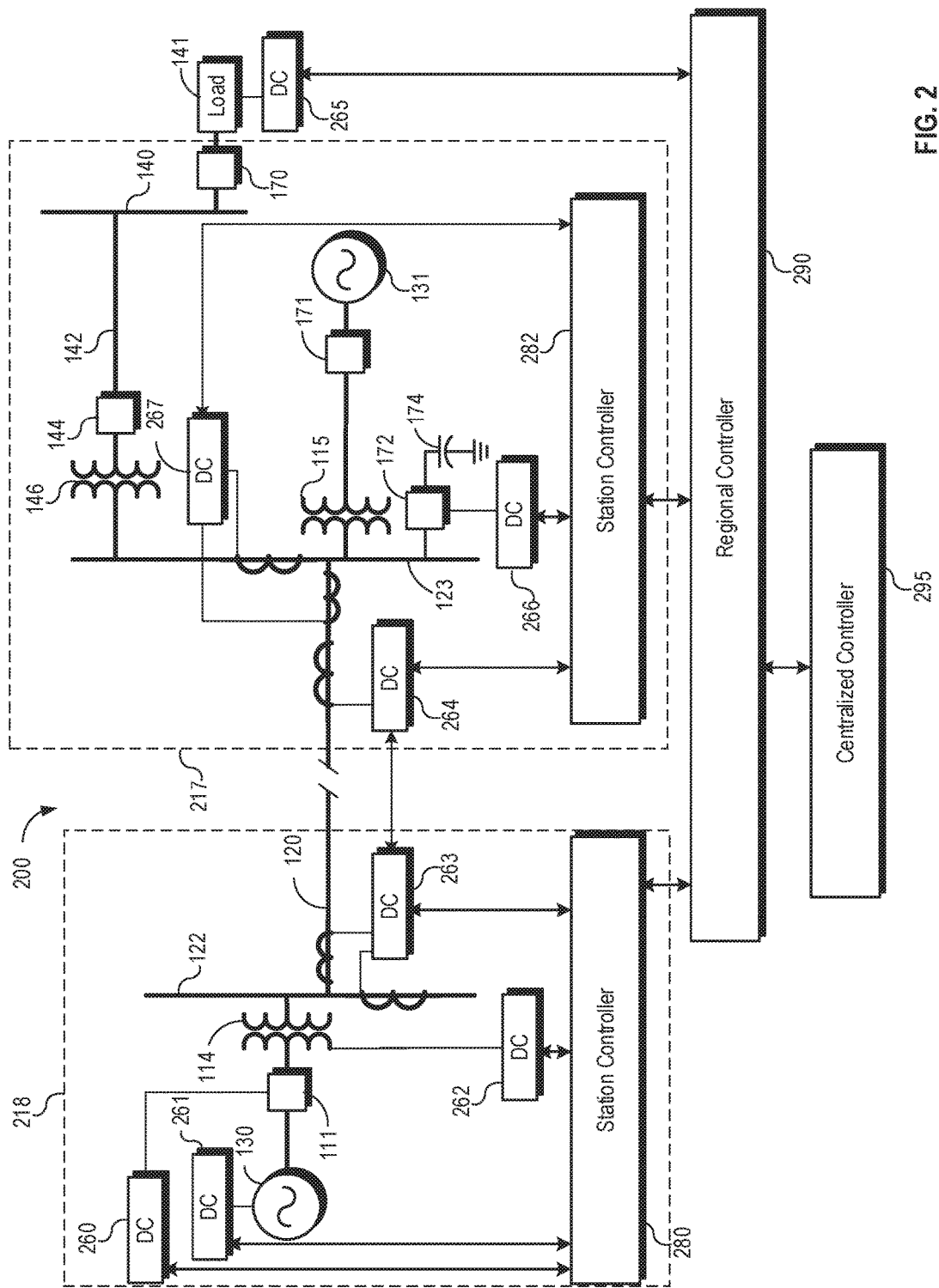
FIG. 2 is a simplified one-line diagram of an embodiment of an electric power delivery system with distributed coordinated wide-area control.

FIG. 2 illustrates a simplified one-line diagram of an example of an electric power delivery system similar to that of FIG. 1, with a distributed coordinated wide-area control system for protection, monitoring, automation, and control thereof. In general, both operational conditions and controller conditions are shared among distributed controllers and coordination controllers throughout the system, providing each controller with information necessary to improve automation, protection, and control of the electric power delivery system. As previously described, coordinated wide-area controllers may use updated transient simulation models based on real-time protections settings of protective IEDs (e.g., distributed controllers) to generate dynamic RASs.

FIG. 2 includes generators 130 and 131, transformers 114, 115, and 146, buses 122, 123, and 140, a transmission line 120, a distribution line 142, a load 141, an SCB 174, and breakers 111, 144, 170, 171, and 172. FIG. 2 also illustrates that certain of the equipment may be included in certain regions 218 and 217 which may be geographically separated by long distances. A first region 218 may include a generator 130, transformer 114, transmission bus 122, and one end of transmission line 120, and various breakers. A second region 217 may include another end of the transmission line 120, a transmission bus 123, transformers 115 and 146, a distribution bus 140, a generator 131, an SCB 174, and various breakers.

Various types of equipment may be controlled using distributed controllers 260-267. Distributed controllers may include the functions of IEDs as described above. That is, distributed controllers generally may obtain equipment status and/or measurements, derive or calculate derived values therefrom, and determine controller conditions and control instructions by including IED functionality. The IED functionality, as part of an integrated module, may include, for example, protection and/or control logic, IED characteristics, elements, thresholds, settings, and the like. Control instructions may include, as described above, commands such as breaker trip, breaker close, recloser open or close, tap up, tap down, exciter voltage control, inverter control, and the like.

As described above in conjunction with IED functionality, a distributed controller may include, as part of its IED module, an inverse-time overcurrent element, and may derive current magnitudes of a conductor from current measurements thereof. The distributed controller may apply the current magnitudes to the inverse-time overcurrent element. Protection settings may of the IED may determine the time duration for which a current of a certain magnitude must persist before issuing an open (or trip) command to a circuit breaker to protect the electric power delivery system. Accordingly, the distributed controller may apply operational conditions to an IED module to determine a controller condition and a control instruction that are based largely on set points of the protection settings.

FIG. 2 illustrates several examples of distributed controllers 260-267 (e.g., IEDs) for control of the electric power delivery system 200. The distributed controllers 260-267 may be in communication with equipment of the electric power delivery system 200, may obtain equipment status and measurements therefrom, may derive or calculate derived values, and apply such to their IED module. For example, the distributed controller 261 may be in communication with the generator 130 to receive measurements therefrom such as currents, voltages, temperatures, rotational signals, and the like, and to receive equipment status therefrom such as exciter voltages and the like. The distributed controller 261 may derive or calculate derived values such as voltage magnitude and angle, current magnitude and angle, shaft rotational position, shaft speed, phase angle, power angle, frequency, rate of change of frequency, and the like. The distributed controller 261 may apply certain of the operational conditions to an IED module. For example, the distributed controller 261 may apply the calculated frequency to an overfrequency element, as part of the IED module and determine an action to be taken, such as a breaker open, exciter voltage change, or the like, in response to specific system states and/or events based on the distributed controller's protection settings.

Similarly, the distributed controller 262 may be in communication with transformer 114, and may calculate or derive current and voltage magnitudes and angles for transformer high-side windings, low-side windings, tertiary windings and the like from obtained voltage and current measurements, and may obtain oil temperatures from the transformer 114. The distributed controller 262 may apply such operational conditions to, for example, an IED module with protection settings to determine if transformer 114 should be removed from service for certain conditions such as insulator breakdown, oil temperature exceeding a threshold, and the like. The IED module may include, for example, a through-fault element, an overload element, a differential element, a ground fault protection element, and the like. Set points for opening a breaker or otherwise removing the transformer 114 from service may be defined in user-adjustable and/or automatically adjusted protection settings.

The distributed controllers 263 and 264 may be in communication with the transmission line 120, and may obtain voltage and/or current measurements therefrom, and may derive or calculate voltage and/or current magnitudes and/or angles, power flow, symmetrical components, alpha components, Clarke components, and the like therefrom. The distributed controllers 263 and 264 may be configured to apply differential protection to the transmission line 120, and, therefore, the IED module may include, for example, differential protection elements. The differential protection may be based on protection settings that may be dynamically updated based on system conditions, topology changes, deterioration of equipment, and the like.

The distributed controller 265 may be in communication with a load center 141. In one embodiment, the distributed controller 265 may be a meter configured to meter power to load center 141. In this embodiment, the distributed controller 265 may obtain voltage and/or current measurements, and derive or calculate, for example, voltage and/or current magnitudes and/or angles, power flow, symmetrical components, alpha components, Clarke components, and the like therefrom. The IED module of the distributed controller 265 may include metering algorithms for metering power flow to load 141.

In another embodiment, the distributed controller 265 may be a voltage regulator control in communication with a voltage regulator configured to regulate voltage to load 141. In this embodiment, the distributed controller 265 may obtain voltage measurements, current measurements, and voltage regulator status (e.g. tap position from the voltage regulator). The distributed controller 265 may then derive or calculate voltage and/or current magnitudes and/or angles at the voltage regulator, voltage and/or current magnitudes and/or angles at a load center, power flow, symmetrical components, alpha components, Clarke components, and the like therefrom. The distributed controller 265 may include an IED module that includes a voltage regulation module configured to control electrical power to be within a certain voltage band to load center 141. The distributed controller 265 may apply the equipment status, measurements, and derived values to the IED module to determine an appropriate tap position or tap change for the voltage regulator. The distributed controller 265 may then issue a tap change command to the voltage regulator depending on the determination. The commands, tap positions, and other changes may be based on protection settings of the IED module of the distributed controller 265 that may be dynamically updated automatically and/or altered by a user/operator.

The distributed controller 266 may be configured to control the electric power delivery system 200 by controlling the SCB 174. In this embodiment, the distributed controller 266 may obtain voltage measurements, current measurements, and breaker status (e.g. from breaker 172). The distributed controller 266 may then derive or calculate voltage and/or current magnitudes and/or angles, voltage and/or current magnitudes and/or angles at a load center, real power, reactive power, symmetrical components, alpha components, Clarke components, and the like therefrom. Based on dynamically adjustable protection settings, the distributed controller 266, potentially via an IED module, may control reactive power on the electric power delivery system to maintain it within an acceptable range by switching on the SCB 174 when reactive power falls below a predetermined threshold. The distributed controller 266 may apply the equipment status, measurements, and derived values to the IED module to determine whether to connect the SCB 174. The distributed controller 266 may then issue command to the breaker 172.

FIG. 2 also provides an indication of certain electric power delivery system equipment that are included in the same geographic location or substation. For example, the first region 218 may include the generator 130, the breaker 111, the step-up transformer 114, the bus 122, and part of the transmission line 120. The first region 218 may be considered a generation substation. The second region 217 may include a portion of transmission line 120, the bus 123, the step-up transformer 115, the step-down transformer 146, the breakers 144, 170, 171, and 172, the SCB 174, the generator 131, and the bus 140. The first and second regions 218 and 217 may further include devices for protection, control, automation, and/or metering of the electric power delivery system. For example, the first region 218 may include distributed controllers 260-263. The second region 217 may include different distributed controllers 264, 266, and 267.

As described above in conjunction with FIG. 1, electric power delivery systems may be controlled using IEDs and higher-level controllers such as automation controllers, WACSA systems, SCADA systems, and the like. FIG. 2 further illustrates higher-level controllers used to provide distributed coordinated control for the electric power delivery system 200. The first region 218 includes a station controller 280, and second region 217 includes station controller 282. The station controller 280 may be in communication with the distributed controllers 260-263. The station controller 282 may be in communication with the distributed controllers 264, 266 and 267. The regional controller 290 may be in communication with the station controllers 280 and 282, as well as with distributed controller 265. The centralized controller 295 may be in communication with the regional controller 290. Each of the higher-level controllers (station controllers(s), regional controller(s), and centralized controller(s)) may be considered "coordination controllers" for the purposes of this description.

Coordination controllers and distributed controllers are configured to allow rapid communication of both state and controller conditions between distributed controllers and coordination controllers. With state and controller conditions from other distributed controllers and/or coordination controllers, each of the controllers are then better suited to positively affect distributed and coordinated control of the electric power delivery system 200. As will be described in more detail below, each controller uses the state and controller conditions that are received to affect the control instructions thereof.

For example, the station controllers 280 and 282, the regional controller 290, and/or the centralized controller 295 may utilize the topology of the system, system measurements, and/or updated real-time protection settings of the relevant distributed controllers to perform transient model simulations. The station controllers 280 and 282, the regional controller 290, and/or the centralized controller 295 may utilize the transient model simulations based on the updated real-time protection settings to develop dynamic RASs. The contemplated RASs are enhanced as compared to traditional RAS because they account for adaptive protection settings of the various distributed controllers. In contrast, a traditional RAS may perform transient model simulations using static protection settings of protective devices that may be obsolete or outdated.

Figure 3:
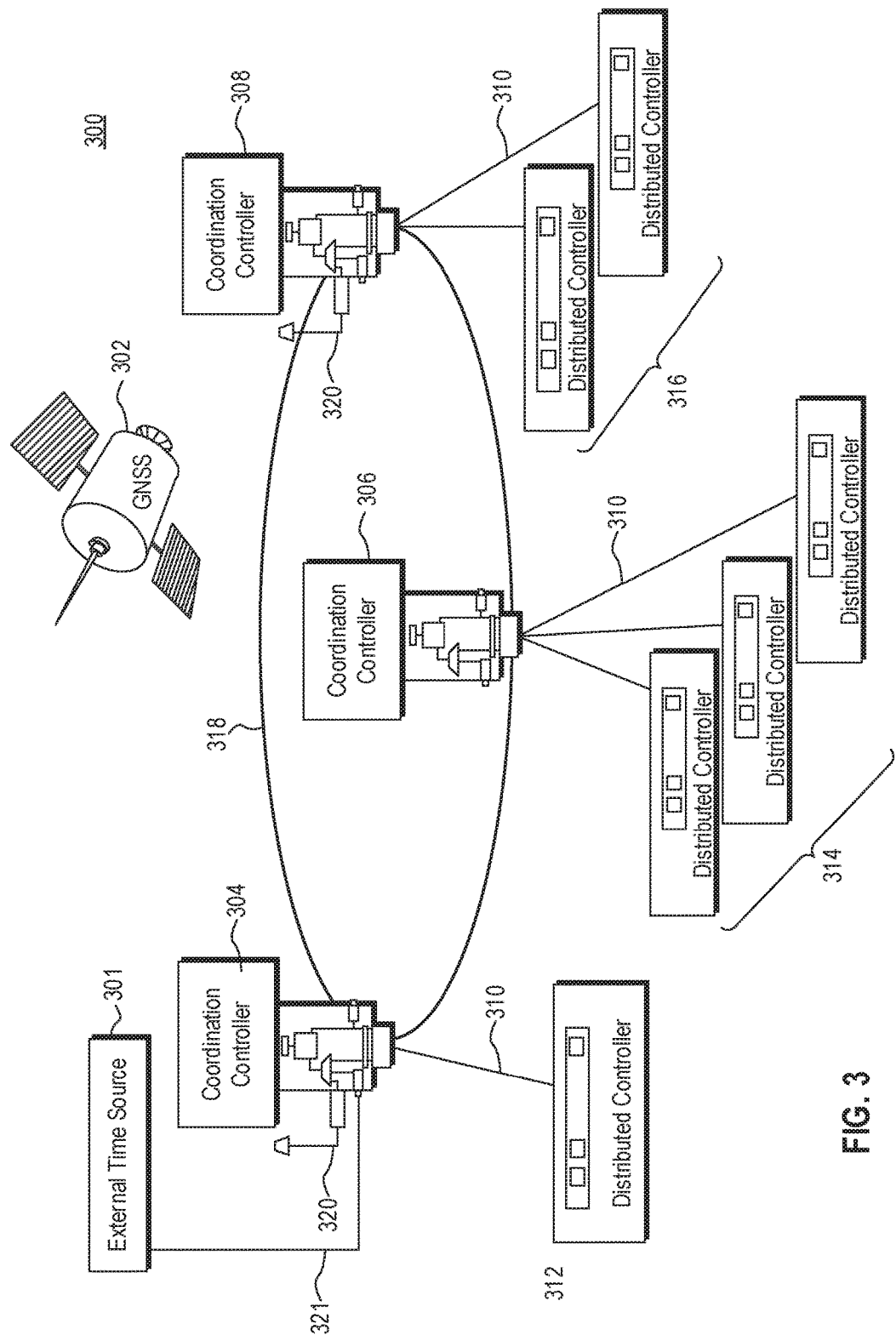
FIG. 3 is an illustration of an embodiment of a communication system for distributed coordinated wide-area control.

FIG. 3 illustrates one example of a communication system 300 for distributing information among controllers. The communication system 300 of FIG. 3 includes several coordination controllers 304, 306, 308, each in communication using a wide-area network (WAN) 318 which may comprise one or more physical connections and protocols. Each coordination controller 304, 306, and 320 may be in communication with one or more distributed controllers. For example, the coordination controller 304 is in communication with the distributed controller 312 using the LAN 310, the coordination controller 306 is in communication with the distributed controllers 314 using the LAN 310, and the coordination controller 308 is in communication with the distributed controllers 316 using the LAN 310.

Each communication from any of the controllers may include a time stamp. Furthermore, equipment statuses and measurements may include time stamps. State conditions may also include time stamps corresponding to a moment in time when the measurements were made or equipment statuses was obtained. Further still, certain distributed controllers may depend on a common time for sampling the electric power delivery system. Accordingly, a common time reference may be distributed to the controllers herein. In one embodiment, the common time reference may be made available to each of the controllers using the WAN 318. Each coordination controller 304, 306, and 308 may be configured to receive time signals. For example, the coordination controller 304 includes an antenna 320 to receive a GNSS signal from a GNSS repeater or satellite 302. The coordination controller 304 may be configured to receive another time signal 321 from an external time source 301.

The external time source may comprise one or more VCTCXOs, phase locked loop oscillators, time locked loop oscillators, rubidium oscillators, cesium oscillators, NIST broadcasts (e.g., WWV and WWVB), and/or other devices capable of generating precise time signals. In the illustrated embodiment, the coordination controller 308 includes an antenna 320 configured to receive a GNSS signal from the GNSS repeater or satellite 302. As illustrated, the coordination controller 306 does not directly receive an external time signal, however, according to alternative embodiments, any number and variety of external time signals may be available to any of the time distribution devices.

According to one embodiment, the WAN 318 comprises a SONET configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure.

The distributed controllers 312, 314, and 316 may receive a common time signal from coordination controller 304. In another embodiment, the distributed controllers 312, 314, and 316 may receive a common time signal from the GNSS repeater or satellite 302.

Figure 4:
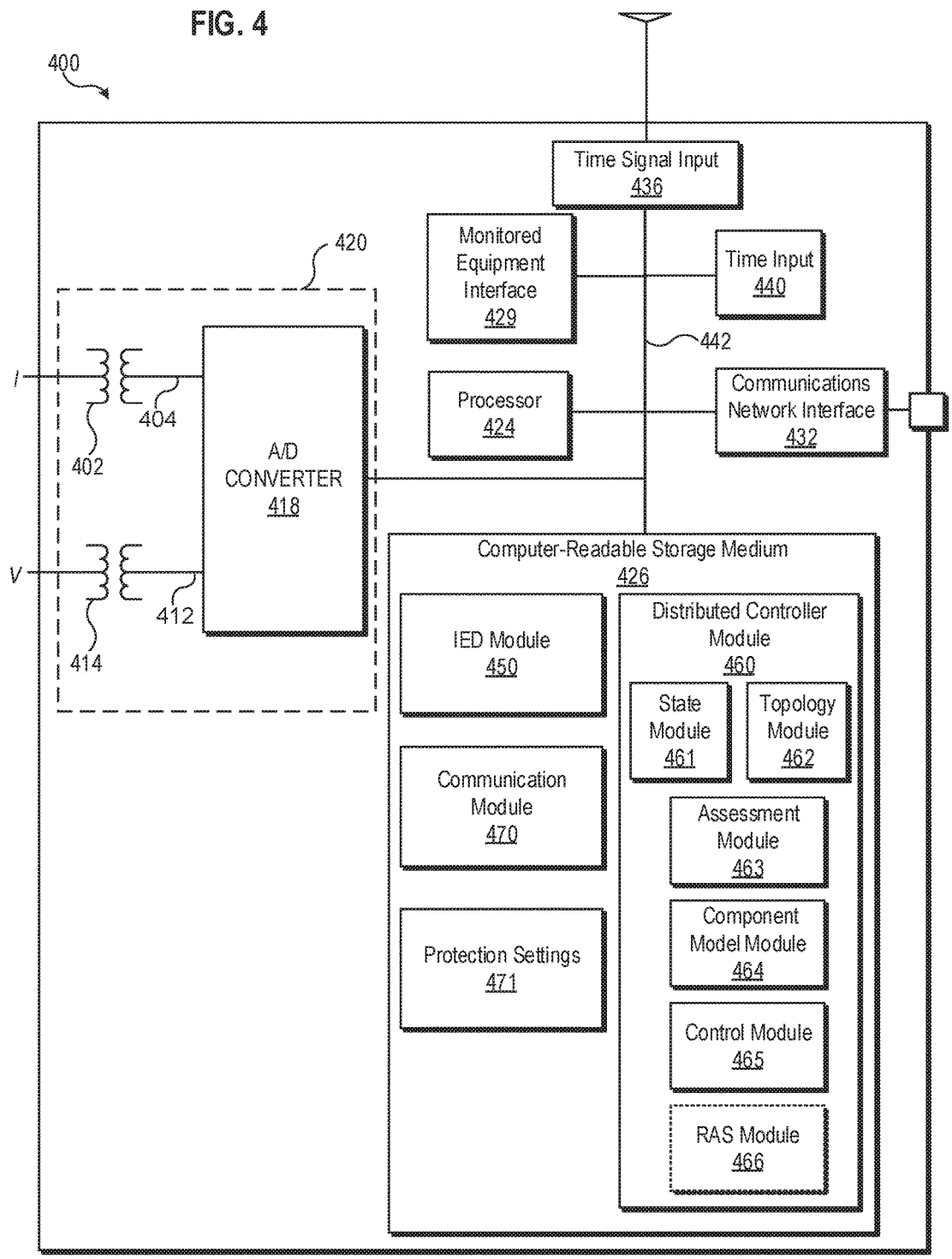
FIG. 4 is a functional block diagram of a distributed controller, according to one embodiment.

FIG. 4 illustrates a simplified block diagram of a distributed controller 400, according to one embodiment. Depending on the specific embodiment and application, not every module of the distributed controller 400 is required. The distributed controller 400 includes a network interface 432 configured to communicate with a communication network. The distributed controller 400 also includes a time input 440, which may be used to receive a time signal. In certain embodiments, a common time reference may be received via a network interface 432, and accordingly, a separate time input and/or GNSS input 436 would not be necessary. One such embodiment may employ the IEEE 1588 protocol. Alternatively, a GNSS input 436 may be provided in addition or instead of a time input 440.

A monitored machine or equipment interface 429 may be configured to receive equipment status information from, and issue control instructions to a piece of monitored equipment, such as an electrical generator, breaker, voltage regulator control, or the like. According to certain embodiments, the monitored equipment interface 429 may be configured to interface with a variety of equipment of an electric power delivery system. In certain embodiments, the equipment status information and control instructions may be communicated over the communications network interface 432.

A computer-readable storage medium 426 may be the repository of one or more modules and/or executable instructions configured to implement any of the processes described herein. A data bus 442 may link the monitored equipment interface 429, the time input 440, the network interface 432, the time signal input 436, and the computer-readable storage medium 426 to a processor 424.

The processor 424 may be configured to process communications received via the network interface 432, the time input 440, the GNSS input 436, and/or the monitored equipment interface 429. The processor 424 may operate using any number of processing rates and architectures. The processor 424 may be configured to perform various algorithms and calculations described herein using computer executable instructions stored on computer-readable storage medium 426. The processor 424 may be embodied as a general purpose integrated circuit, an application specific integrated circuit, a field-programmable gate array, and other programmable logic devices.

In certain embodiments, the distributed controller 400 may include a sensor component 420. In the illustrated embodiment, the sensor component 420 is configured to gather data from a portion of the electric power delivery system (not shown) using a current transformer 402 and/or a voltage transformer 414. The voltage transformer 414 may be configured to step-down the power system's voltage (V) to a secondary voltage waveform 412 having a magnitude that can be readily monitored and measured by the distributed controller 400. Similarly, the current transformer 402 may be configured to proportionally step-down the power system's line current (I) to a secondary current waveform 404 having a magnitude that can be readily monitored and measured by the distributed controller 400.

Although not separately illustrated, the voltage and current signals, V and I, may be secondary signals obtained from equipment instruments designed to obtain signals from primary equipment. For example, a secondary voltage signal V may be obtained from a potential transformer ("PT") in electrical communication with a conductor. A secondary current signal I may be obtained from a current transformer ("CT") in electrical communication with a conductor. Various other instruments may be used to obtain signals from electric power delivery systems including, for example, Rogowski coils, optical transformers, and the like. An analog-to-digital converter 418 may multiplex, sample and/or digitize the filtered waveforms to form corresponding digitized current and voltage signals. Similar values may also be received from other distributed controllers, station controllers, regional controllers, or centralized controllers. The values may be in a digital format or other format.

As described above, certain embodiments may monitor the terminal voltage of one or more phases of electrical power generated by an electrical generator. The sensor component 420 may be configured to perform this task. Further, the sensor component 420 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

The A/D converter 418 may be connected to the processor 424 by way of a bus 442, through which digitized representations of current and voltage signals may be transmitted to the processor 424. As described above, the processor 424 may be used to apply equipment status, measurements, and derived values to an IED module. The processor 424 may be used to determine and issue control instructions.

It should be noted that a separate device may be used in place of a sensor component for providing signals from the electric power delivery system to the distributed controller 400. Indeed, a separate device may be configured to obtain signals from the electric power delivery system (such as voltage and/or current signals), and create digitized representations of the signals (for example current and voltage signals), apply a time stamp, and/or supply such information to the distributed controller 400. Further, the separate device may be configured to supply equipment status and/or measurements such as voltage and/or current magnitudes and/or angles along with time stamps to the distributed controller 400. In certain embodiments, the information that has been described as received from sensor component 420 is instead received from communications network interface 432.

A monitored equipment interface 429 may be configured to receive status information from, and issue control instructions to a piece of monitored equipment. The monitored equipment interface 429 may be configured to issue control instructions to one or more pieces of monitored equipment. According to some embodiments, control instructions may also be issued via the network interface 432. Control instructions issued via the network interface 432 may be transmitted, for example, to other distributed controllers, coordination controllers, IEDs, or the like (not shown), which in turn may issue the control instruction to a piece of monitored equipment. Alternatively, the piece of monitored equipment may receive the control instruction directly via its own network interface.

The computer-readable storage medium 426 may be the repository of one or more modules and/or executable instructions configured to implement certain functions described herein. For example, the computer-readable storage medium 426 may include an IED module 450, which may include the modules and/or executable instructions for the IED. As described above, the IED module 450 may include protection algorithms, elements, settings, thresholds, timers, and the like. The IED module 450 may include instructions for deriving or calculating derived values, for obtaining equipment status, for obtaining measurements, and applying such to the IED module 450. The IED module 450 may determine controller conditions, control instructions, state to communicate, state to store, and the like.

The IED module 450 may utilize protection settings 471 to determine the control instructions. Protection settings 471 may be dynamically updated and modified based on previous states, system measurements, calculated values, and the like. In some embodiments, protection settings 471 may be initially set by a user and/or a range of protection settings 471 may be set by a user. The protection settings 471 may, however, dynamically shift as per the original settings provided by a user. For example, a user may program the protection settings 471 to have various values based on specific measured values. The protection settings 471 may therefore be user-specified and yet continually adapt to system conditions. The set points of the updated protection settings 471 may be communicated via communications network interface 432 to higher level monitoring and protection equipment.

The control instructions, based on the protection settings, may be communicated to monitored equipment using the monitored equipment interface 429. The IED module 450 may further include instructions for applying a time stamp to equipment status as it is obtained, to measurements as they are obtained, to derived values and/or controller condition as they are obtained or corresponding to when the measurements leading thereto are obtained, to control instructions as they are given, and the like.

The computer-readable storage medium 426 may further include a distributed controller module 460, which may be a repository of the modules and/or executable instructions configured to implement distributed controller functionality of distributed controller 400. The distributed controller module 460 may include, among others, a state module 461 for processing the state, a topology module 462, an assessment module 463, a component model module 464, a control module 465, and optionally a RAS module 466. Each module within the distributed controller module 460 may use state from the IED module 450, from the sensor component 420, from the monitored equipment interface 429, from the time input 440, and/or from other distributed controllers, monitored equipment, or coordination controllers using the communications network interface 432. In some embodiments, an optional RAS module 466 may be used to define remedial actions that should be implemented by the distributed controller 400 in response to specific events. If the distributed controller 400 monitors multiple pieces of equipment that have their own adaptive protection settings, the RAS module 466 may develop a RAS based on updated, real-time protection settings of the equipment protected by the distributed controller.

The state module 461 may include instructions to determine an electric power delivery system state which may include state of the monitored equipment and the controller condition. That is, the state may include data for defining a state of the monitored equipment, for example, measurements (voltages, currents, and the like), equipment status (breaker open/closed, and the like), derived values, and/or controller condition. The measurements, equipment status, and derived values may be received from the sensor component 420, from the communication network interface 432, and/or from the monitored equipment interface 429. The measurements may be received with time-stamps or may be issued a corresponding time-stamp by using the time signal input 436, or the time received from the communication network interface 432, as previously described. The protection or controller condition may be received from external IED devices using the sensor component 420, or communication network interface 432, or monitored equipment interface 429.

The state module 461 may also include instructions to obtain such state information from the IED module 450, and the IED module 450 might also include instructions to calculate a protection or controller condition. The state module 461 may include instructions to derive such state information based on a model from the component model module 464, to be described in more detail below. The state module 461 may further include instructions to refine information from the IED module 450 based on a model from the component model module 464. The state module 461 may refine values using a filter such as a low-pass filter. The state module 461 may refine values by comparing values against expected ranges and/or other recent measurements. When such values are not acceptable based on the expected ranges and/or other recent measurements, the values may be indicated as being potentially inaccurate. As described in more detail below, the communication module 470 may include instructions to send information from the state module 461 to other distributed controllers and/or coordination controllers, and include with the information the indication that such information may be inaccurate.

The topology module 462 may include instructions to determine a topology of at least a portion of the electric power delivery system. The topology module 462 may receive information concerning the topology of the electric power delivery system from, for example, a user, other distributed controllers or coordination controllers, or the like. The topology information may be limited by the user to include a portion of the electric power delivery system topology. The topology module 462 may include instructions to modify the stored topology information based on state.

For example, if the distributed controller 400 receives information concerning open or closed status of a switch, the topology module 462 may update its topology based on the received information. Further, the topology module 462 may use values such as currents and/or voltages to determine the topology. For example, Kirchhoff's law may be used to determine which nodes of the topology are connected to which other nodes of the topology, and, hence, the topology may be updated using such information. Additional methods for determining a topology are found in U.S. Pat. No. 7,856,327 titled "State and Topology Processor," which is hereby incorporated by reference in its entirety.

The assessment module 463 includes instructions for indicating proximity to boundaries, which may indicate how close the IED module 450 of the distributed controller 400 or another controller such as an external IED (which may include any of the components described herein) is to reaching a condition where a control instruction may be issued. The assessment module 463 may utilize real-time updated protection settings from the external IED to determine how close the external IED is to reaching a condition where a control instruction may be issued.

The control instructions define operations, such as protective control operation, and may be related to a continuous or a discontinuous control operation. A discontinuous control operation may change either the topology of the electric power delivery system or result in reaching a capability limit of the equipment or a controller. For example, the assessment module 463 may use the real-time protection settings and state and the model information as part of the IED module 450 to determine that a breaker should open due to an overcurrent condition in a certain amount of time if the condition persists (and no other actions are taken to correct the overcurrent condition).

In another example, the assessment module 463 may determine a time before a controller (such as a distributed controller or an external IED, which also may include protection or controller condition) will issue a command to a synchronous machine to decrease the amount of reactive power the synchronous machine produces due to the rotor field thereof reaching a thermal limit from excessive reactive power being supplied by the synchronous machine. Such information may be communicated to other distributed controllers and/or coordination controllers using the communication module 470 as described in more detail below.

Thus, information about actions to be taken in the future by the distributed controller 400 and/or a time before such actions are to be taken may be communicated to other distributed controllers and/or coordination controllers. State modules and component model modules of other distributed controllers and/or coordination controllers could then use this information in determining a state and/or model of the electric power delivery system. By providing this information to other distributed controllers and/or coordination controllers, modeling errors and/or complexity thereof may be reduced. The protection settings 471 may be dynamically updated based on measurement data, topology changes, and system states. Accordingly, real-time updates to the protection settings 471 may be shared between distributed controllers and/or higher level controllers.

The component model module 464 may include instructions for determining a model of the electric power delivery system. The component model module 464 may include instructions for interpreting the state determined by the state module 461 and/or the topology determined by the topology module 462. For example, the component module 464 may perform transient model simulations based on the topology from the topology module 462, measurement data from the sensors 420, and the protection settings 471 of the distributed controller 400 and potentially those from other distributed controllers. Alternative model simulations may be utilized instead of transient model simulations. Basic transient model simulations may be encompassed by calculations of voltage, current, and/or frequency at specific locations within the power system under defined system conditions. In the protection, automation, control, and/or metering of an electric power delivery system, different information from different devices may be made available. That is, devices may be manufactured by different entities, include different settings or thresholds, and the like, and may, therefore, provide different information. The component model module 464 may include instructions to improve this different information.

The component model module 464 may include instructions to provide an estimate when certain state information is not available. For example, if a measurement normally provided by a sensor is not available, the component model module 464 may use a state from the state module 461 and/or a topology from the topology module 462 to provide an estimate for the missing measurement. In another example, if a distributed controller or an IED is not set to provide a derived value, the component model module 464 may use a state from the state module 461 and/or a topology from the topology module 462 to provide an estimate for the missing derived value. In yet another example, if an equipment status is missing, the component model module 464 may use a state from the state module 461 and/or a topology from the topology module 462 to provide an estimate for the missing equipment status. The component model module 464 may include instructions to supply a time stamp with the estimates. Further, as with the state module 461, the component model module 464 may be configured to indicate information that is estimated.

Furthermore, the component model module 464 may include instructions to determine an IED model. The component model module 464 may model, for example, a protection algorithm of an IED model (either an IED 450 or an external IED), and execute the protection algorithm using the same inputs (equipment status, measurements, and/or derived values either provided from the distributed controller or estimated by the component model module 464) as the protection algorithm would use. The component model module 464 may then use the execution to determine a state of the IED model. Such state may be used by the assessment module 463.

The component model module 464 may further be used to calculate future state. Accordingly, the component model module 464 may include a load-flow level simulation engine and/or a transient level simulation engine. A load-flow engine may be used for calculating dynamics such as, for example, those related to voltage collapse and asset removal due to overload. The transient level simulation engine may be used for calculating dynamics such as, for example, those related to rotor angle instability. Such simulations may be applied to either initial state measurements and/or controller conditions, received from the state module 461, to determine a future state of the electric power delivery system. Modeling by the component model module 464 may be based on dynamic adaptive protection settings of the distributed controller 400, associated distributed controllers, and lower level IEDs, and/or protective elements of protective devices of system equipment.

Distributed controllers and/or coordination controllers may utilize state data and protective device settings to make control decisions in advance of when such decisions would typically be made in systems where information is only available as it is measured. For example, the RAS module 466 may develop a RAS for various possible scenarios. Accordingly, each time a new set of states, measurements, and/or protection settings are received, a simulation (such as a transient simulation model) may provide another set of future state information.

As is described in more detail below, the component model module 464 may receive control instruction suggestions from other distributed controllers and/or coordination controllers. The component model module 464 may use such instructions in its determination of possible future states of the electric power delivery system.

The control module 465 may include instructions for determining a control instruction based on outputs of the component model module 464, the assessment module 463, the topology module 462, the state module 461, the RAS module 466, and/or the IED module 450. Control instructions from the control module 465 may be intended as control instructions for other distributed controllers and/or coordination controllers to take, and may be related to machines or equipment in communication with other distributed controllers. In some cases, control instructions may be only informative or suggestive in nature in that the receiving distributed controller is not obligated to perform the control instruction, but may use the suggested control instruction in coordination with its own determinations and those from other controllers to determine whether it will perform the control instruction.

A receiving distributed controller may use the suggested control instruction to determine a future state of the electric power delivery system using its component model module, and use the result of its component model module to issue a control instruction to its monitored equipment. In other cases, control instructions may be directive in that they are required actions. Differentiation between these cases may be included with the control instruction.

The communication module 470 may include instructions regarding communication of information from the IED module 450, the distributed controller module 460, the state module 461, the topology module 462, the assessment module 463, the component model module 464, and/or the control module 465 to other controllers. The communication module 470 may include instructions on the formatting of communications according to a predetermined protocol. For example, the distributed controllers and controllers may be configured to communicate according to the IEC 61850 protocol, wherein the communication module 470 may be configured to format communications according to that protocol, receive communications according to that protocol, and make information therefrom available to other modules. The communication module 470 may be configured with subscribers to certain information, and format message headers according to such subscription information. Communication module 470 may be configured to format communications according to a packet structure such as that illustrated in FIG. 6 and described in more detail below.

The various modules of the distributed controller module 460 may use state, controller conditions, and/or protection settings from other distributed controllers and/or other coordination controllers. As is described herein, state, controller conditions, and/or protection settings may be communicated among distributed controllers and/or coordination controllers, and used within various of the modules thereof. For example, a distributed controller may use the topology determined by another distributed controller in its assessment module to determine missing state information thereof. As another example, a distributed controller may use the protection settings associated with another distributed controller or associated protective relay in its assessment module and/or RAS module to determine actions to be taken in response to certain event or system condition. The terms "event" and "condition" may be used synonymously to describe a state, condition, event, status, or other characteristic of an electrical power system.

Figure 5:
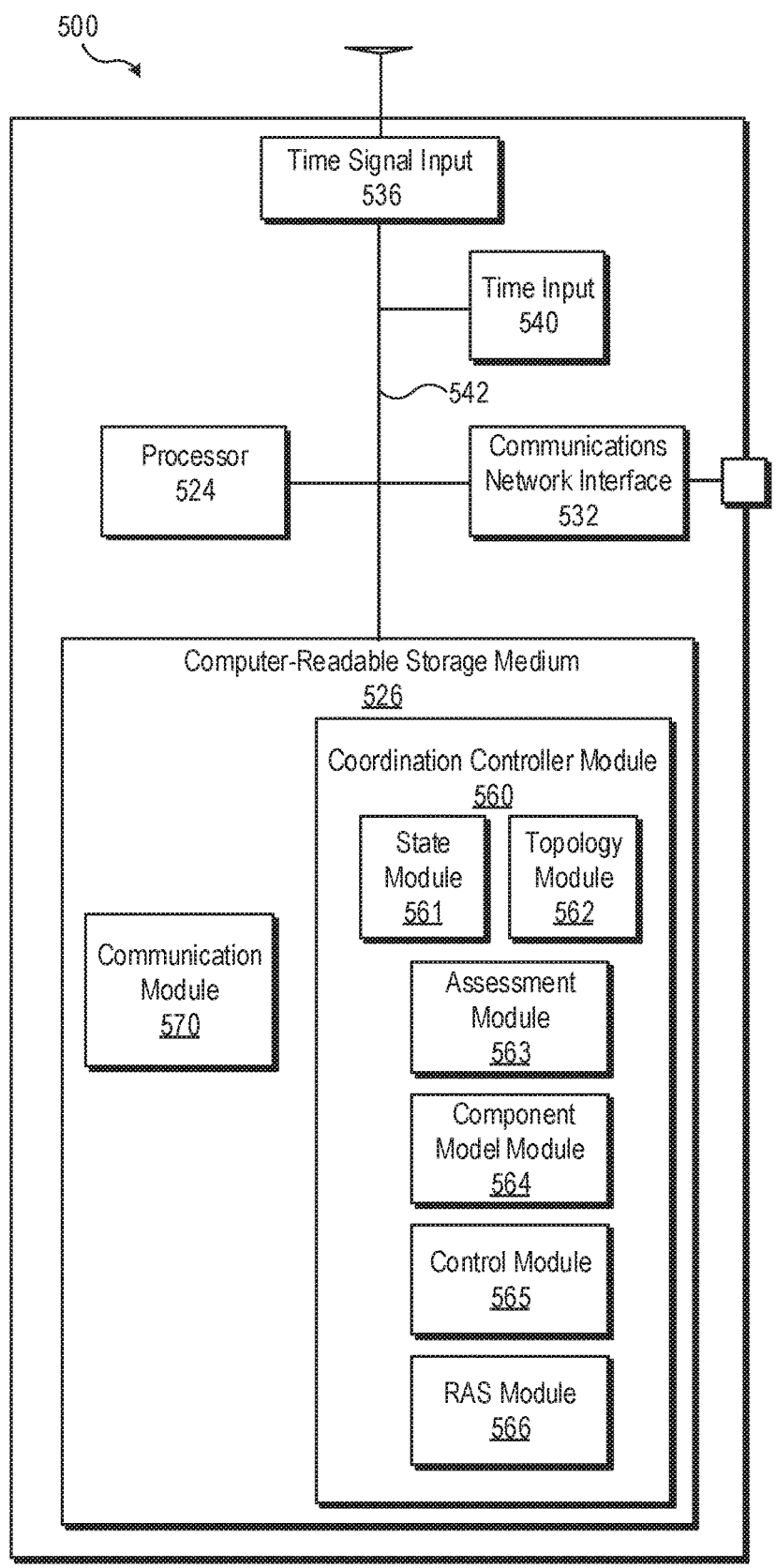
FIG. 5 is a functional block diagram of a coordination controller, according to one embodiment.

FIG. 5 illustrates a functional block diagram of an example of a coordination controller 500. In some embodiments, one or more components and/or modules may be omitted. As described above in conjunction with FIG. 2, distributed controllers may be in communication with equipment of an electric power delivery system. Distributed controllers may communicate information directly to other distributed controllers and/or to coordination controllers such as station controller(s), regional controller(s), and/or centralized controller(s), such as coordination controller 500. Each of the station, regional, and centralized controllers may perform similar functions, but include different levels of control and/or granularity of data. For example, a regional controller may include a topology module that determines a topology of a portion of the electric power delivery system monitored by each of the distributed controllers that send information to the particular regional controller, whereas station controllers may include a topology module that determines a topology of the electric power delivery system monitored by each of the distributed controllers that send information to the particular station controller.

Similar to the distributed controller 400 illustrated in FIG. 4, coordination controller 500 of FIG. 5 may include a time signal input 536, a time input 540, a communications network interface 532, and a processor 524. In some embodiments, the coordination controller 500 does not receive measurements or equipment status directly from a machine or equipment, and so does not include a monitored equipment interface. In other embodiments, the coordination controller may include a monitored equipment interface. A data bus 542 may link the time input 540, the network interface 532, the time signal input 536, and the computer-readable storage medium 526 to a processor 524.

The computer-readable storage medium 526 may include modules similar to those of the distributed controller 400 of FIG. 4. The computer-readable storage medium 526 may include a coordination controller module 560 which may be a repository of the modules and/or executable instructions configured to implement the coordinated controller functionality of coordination controller 500. The coordination controller module 560 may include, among others, a state module 561, a topology module 562, an assessment module 563, a component model module 564, a control module 565, and/or a RAS module 566. Each module within the coordination controller module 560 may use information from distributed controllers and/or other coordination controllers.

For example, modules within the coordination controller module 560 may use state, protection settings, and/or controller conditions communicated from distributed controllers and/or other coordination controllers over the communications network interface 532. Modules within the coordination controller module 560 may further use time information from the time input 540.

The state module 561 may include instructions to determine an electric power delivery system state which may include state of the monitored equipment and the controller condition. That is, the state may include data for defining a state of the monitored equipment, for example, measurements (voltages, currents, and the like), equipment status (breaker open/closed, and the like), derived values, and/or controller condition, which may be provided to the coordination controller originating from distributed controllers. The state module 561 may include instructions to obtain such state information from the communication module 570.

The state module 561 may include instructions to derive such state information based on a model from the component model module 564, to be described in more detail below. The state module 561 may further include instructions to refine information from a model generated by the component model module 564. The state module 561 may refine values using a filter such as a low-pass filter. The state module 561 may refine values by comparing values against expected ranges and/or other recent measurements. When such values are not acceptable based on the expected ranges and/or other recent measurements, the values may be indicated as being potentially inaccurate. As described in more detail below, the communication module 570 may include instructions to send information from the state module 561 to distributed controllers and/or other coordination controllers, and include with the information the indication that such information may be inaccurate.

The topology module 562 may include instructions to determine a topology of at least a portion of the electric power delivery system. The topology module 562 may receive information concerning the topology of the electric power delivery system from, for example, a user, distributed controllers or other coordination controllers, or the like. The topology information may be limited by the user to include a portion of the electric power delivery system topology. The topology module 562 may include instructions to modify the stored topology information based on state. For example, if the distributed controller receives information concerning open or closed status of a switch, the topology module 562 may be configured to update its topology based on the received information concerning the open or closed status of the switch. Further, the topology processor 562 may be configured to use values such as currents and/or voltages to determine the topology. For example, Kirchhoff's law may be used to determine which nodes of the topology are connected to which other nodes of the topology, and, hence, the topology may be updated using such information.

The assessment module 563 includes instructions for indicating proximity to boundaries, which may indicate how close an IED model (from, for example, a distributed controller, the component model module 564, or another coordination controller) is to reaching a condition where a control instruction may be issued based on real-time protection settings of the relevant IEDs. The control may be related to a continuous or a discontinuous control operation (collectively referred to as "protective control operations"). A discontinuous control operation may change either the topology of the electric power delivery system or result in reaching a capability limit of the equipment or a controller.

For example, the assessment module 563 may use an IED model, protective device settings (i.e., protection settings), and/or the state to determine that a control instruction will be issued to open a breaker due to an overcurrent condition in a certain amount of time if the condition persists (and no other actions are taken to correct the overcurrent condition). In another example, the assessment module 563 may determine a time before a controller (such as a distributed controller) will issue a command to a synchronous machine to decrease the amount of reactive power the synchronous machine produces due to the rotor field thereof reaching a thermal limit from excessive reactive power being supplied by the synchronous machine. Such information may be communicated to distributed controllers and/or other coordination controllers using the communication module 570, examples of which are described in U.S. Pat. No. 9,383,735 titled "Distributed Coordinated Electric Power Delivery Control System Using Component Models," which is hereby incorporated by reference in its entirety.

Thus, information about actions to be taken in the future by a distributed controller and/or a time before such actions are to be taken may be communicated to distributed controllers and/or other coordination controllers. State modules and component model modules of distributed controllers and/or other coordination controllers could then use this information in determining a state and/or model of the electric power delivery system. By providing this information to distributed controllers and/or other coordination controllers, modeling errors and/or complexity thereof may be reduced.

The component model module 564 may include instructions for determining a model of the electric power delivery system. The component model module 564 may include instructions for interpreting the state determined by the state module 561 and/or the topology determined by the topology module 562. In the protection, automation, control, and/or metering of an electric power delivery system, different information from different devices may be made available. Devices may be manufactured by different entities, include different settings or thresholds, and the like, and may, therefore, provide different information. The component model module 564 may include instructions to improve this different information. The component model module 564 may be implemented as a component modeling system (e.g., a process, electronic circuits, memory, instructions, and/or the like) to provide the results of a transient model simulation. A component modeling system may be embodied within the component model module 564 or be an external system in communication with the component model module 564.

The component model module 564 may include instructions to provide an estimate when certain state information is not available. For example, if a measurement normally provided by a sensor is not available, the component model module 564 may use a state from the state module 561 and/or a topology from the topology module 562 to provide an estimate for the missing equipment state measurement. In another example, if a distributed controller or an IED is not set to provide a derived value, the component model module 564 may use a state from the state module 561 and/or a topology from the topology module 562 to provide an estimate for the missing derived value. In yet another example, if an equipment status is missing, the component model module 564 may use a state from the state module 561 and/or a topology from the topology module 562 to provide an estimate for the missing equipment status. The component model module 564 may include instructions to supply a time stamp with the estimates.

Furthermore, the component model module 564 may include instructions to determine an IED model. The component model module 564 may model, for example, a protection algorithm of an IED model, and execute the protection algorithm using the same inputs (equipment status, measurements, and/or derived values either provided from the distributed controller or estimated by the component model module 564) as the protection algorithm would use. The component model module 564 may then use the execution to determine a state of the IED model. Such state may be used by the assessment module 563.

The component model module 564 may further be used to calculate future state. Accordingly, the component model module 564 may include a load-flow level simulation engine and/or a transient level simulation engine. The transient level simulation engine may use real-time protection settings from downstream protective IEDs (e.g., distributed controllers and other IEDs) to update the transient simulation model in real-time. In various embodiments, "real-time" may mean that protection settings are continuously provided to higher level IEDs. In other embodiments, "real-time" may mean that only when protection settings are changed are they sent to the component model module 564 of a higher level IED. In yet other embodiments, "real-time" may mean that protection settings are received for downstream protective IEDs (e.g., distributed controllers) on a periodic basis (e.g., hourly, daily, monthly, etc.).

A load-flow engine may be used for calculating dynamics such as, for example, those related to voltage collapse and asset removal due to overload. The transient level simulation engine may be used for calculating dynamics such as, for example, those related to rotor angle instability. Such simulations may be applied to initial state measurements to determine a future state of the electric power delivery system. Such future state may be used by distributed controllers and/or coordination controllers to make control decisions in advance of when such decisions would typically be made in systems where information is only available as it is measured. A prediction interval may be based on a packet transmission interval or on a subset of intervals. Accordingly, each time a new set of states, protection settings, and/or measurements are received, a simulation may provide another set of future state information, based on the new initializing information. The component model module 564 may receive control instruction suggestions from other distributed controllers and/or coordination controllers. The component model module 564 may use such instructions in its determination of possible future states of the electric power delivery system.

The control module 565 may include instructions for determining a control instruction based on outputs of the component model module 564, the assessment module 563, the topology module 562, the RAS module 566, and/or the state module 561. Control instructions from the control module 565 may be intended as control instructions for distributed controllers and/or other coordination controllers to issue, and may be related to machines or equipment in communication with distributed controllers. In some cases, control instructions may be only informative or suggestive in nature in that the receiving distributed controller is not obligated to perform the control instruction, but may use the suggested control instruction in coordination with its own determinations and those from other controllers to determine whether it will perform the control instruction.

The receiving distributed controller may use the suggested control instruction to determine a future state of the electric power delivery system using its component model module, and use the result of its component model module to issue a control instruction to its monitored equipment. In other cases, control instructions may be directive in that they may be required actions. Differentiation between these cases may be included with the control instruction.

The communication module 570 may include instructions regarding communication of information from the coordination controller module 560, the state module 561, the topology module 562, the assessment module 563, the component model module 564, the RAS module 566, and/or the control module 565 to other controllers. The communication module 570 may include instructions on the formatting of communications according to a predetermined protocol.

For example, the distributed controllers and controllers may be configured to communicate according to the IEC 61850 protocol, wherein the communication module 570 may be configured to format communications according to that protocol, receive communications according to that protocol, and make information therefrom available to other modules. The communication module 570 may be configured with subscribers to certain information, and format message headers according to such subscription information. The communication module 570 may be configured to format communications according to a wide variety of packet structures.

Higher-level controllers may include information and modules that are sparser than lower-level controllers. For example, a central controller may include topology and state information for major electric power paths over a wide area, whereas station controllers may include specific topology and state information for each conductor and monitored equipment within a particular substation.

Further, lower level controllers may be configured to communicate less data to higher-level controls. For example, a station controller may be configured to not send all measurements to regional or central controllers.

The distributed coordinated wide-area control system may act to resolve instabilities in the electric power delivery system. Control actions are taken by the distributed controllers, since they are connected to equipment, including breakers, field limiters, capacitor banks, shunt reactors, general loads, motors, generators, and the like.

A source of direction as to the needed control actions is from any of the controllers in the distributed coordinated wide-area control system: distributed controllers, station controllers, regional controllers, or central controllers. The specific details as to how these commands are communicated can be according to any protocol useful for communicating electric power delivery system information such as, for example, IEC-61850, MirroredBits®, fast operate protocol, and the like.

One way of communicating control is through recipes. Recipes may be used to communicate a series of actions to be taken by specific equipment at specific times. Such actions and associated times or delay times may be communicated from a coordination controller to distributed controllers. These communications may include the specific actions to be taken along with the specific times for taking these actions, or times to wait after the first or preceding action is taken. Further information as to recipes is included in US Patent Application Publication Numbers 2011/0035065, 2011/0035066, and 2011/0035076, each of which are incorporated herein in its entirety.

Each controller, whether distributed controller or coordination controller may collect the information it has subscribed to from the other controllers in the network. Accordingly, a controller that subscribes to information from another controller may be a subscribing controller. Any controller (distributed controller or coordination controller) may be a subscribing controller to any other controller in communication therewith. The controller then may combine this information with certain information such as, for example, its equipment status, measurements, derived values, state, models, and/or topology status information. The controller then takes action either based on a present state of the system or based on a prediction of the future state of the system, in accordance with applicable protection settings.

Both discontinuous and continuous control may be regularly applied by IEDs and/or distributed controllers. This disclosure brings new information, and devices to collect, distribute, and simplify this new information, in a manner that may improve the performance of both discontinuous and continuous control. Incorporation of the state and controller conditions may be used to predict the upcoming states of the power system, which may make it possible for the distributed controllers in the distributed coordinated wide-area control system to take a lower cost control action and to do so in a timelier manner than what is possible with the existing methods. Specifically, control actions may be implemented according to RASs that are based on the best, most up-to-date information available, including specifically the real-time protection settings of distributed controllers.

An additional control made possible by the distributed coordinated wide-area control system is through indirect control. State information and controller conditions may be measured and/or modeled by the distributed coordinated wide-area control system, and used to correct a trajectory before action is taken, if such a correction provides a better means to control the power system than an existing discontinuous or continuous control action.

Figure 6:
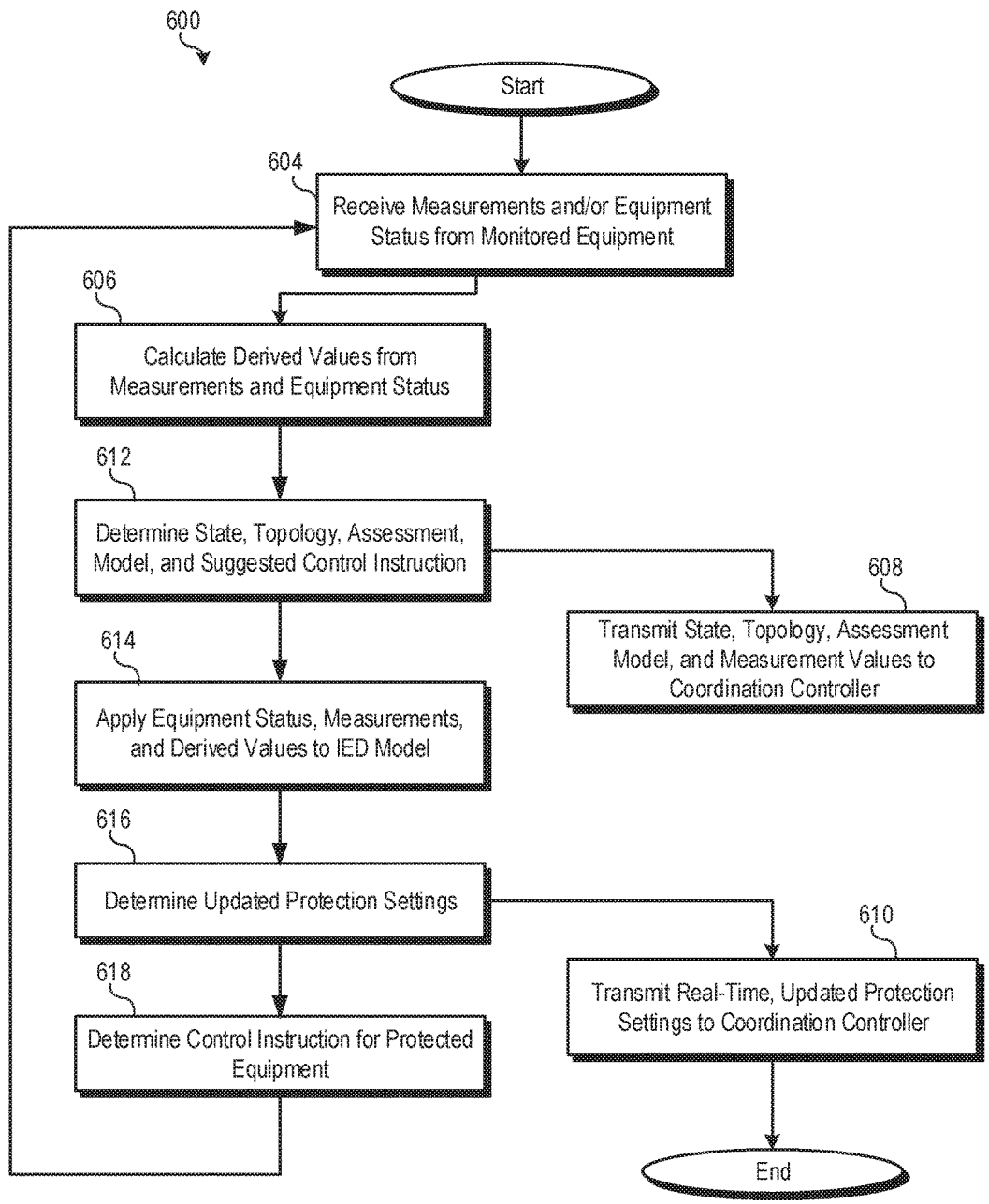

FIG. 6 illustrates one method 600 of providing a coordination controller with real-time, updated protection settings along with measurement data, state data, and the like. As illustrated, a distributed controller may receive measurements and/or equipment status information from monitored equipment, at 604. To perform its own protective functions, the distributed controller may calculate derived values from the measurement and equipment status, at 606. The distributed controller may determine state, topology, assessment model information, and suggested control instructions, at 612. The distributed controller may transmit some or all this information to a coordination controller.

For example, the distributed controller may transmit state data, topology data, assessment model information, and/or measurement values to a coordination controller, at 608. Continuing its protective functions, the distributed controller may apply the equipment status, measurements, and derived values to an IED model, at 614. Based on this information, user-specified instructions, and/or a higher-level controller, the distributed controller may determine updated protection settings, at 616. The updated protection settings may be transmitted to the coordination controller in real time (i.e., upon being changed, continuously, on a periodic basis, etc.), at 610.

The distributed controller, based on the updated protection settings (or alternatively out of illustrated order and using the previous protection settings), may determine and optionally implement or transmit the control instructions to protected equipment, at 618. As new measurement data is collected, the process repeats, at 604. Some or all the steps may be implemented on a periodic basis, though they need not be all implemented on the same periodic basis. For example, transmitting real-time updated protection settings to the coordination controller, at 610 may be performed each minute, hours, daily, weekly, etc., while the control instructions for protecting equipment, at 618, may be performed many times per minute or even many times per second.

Figure 7:
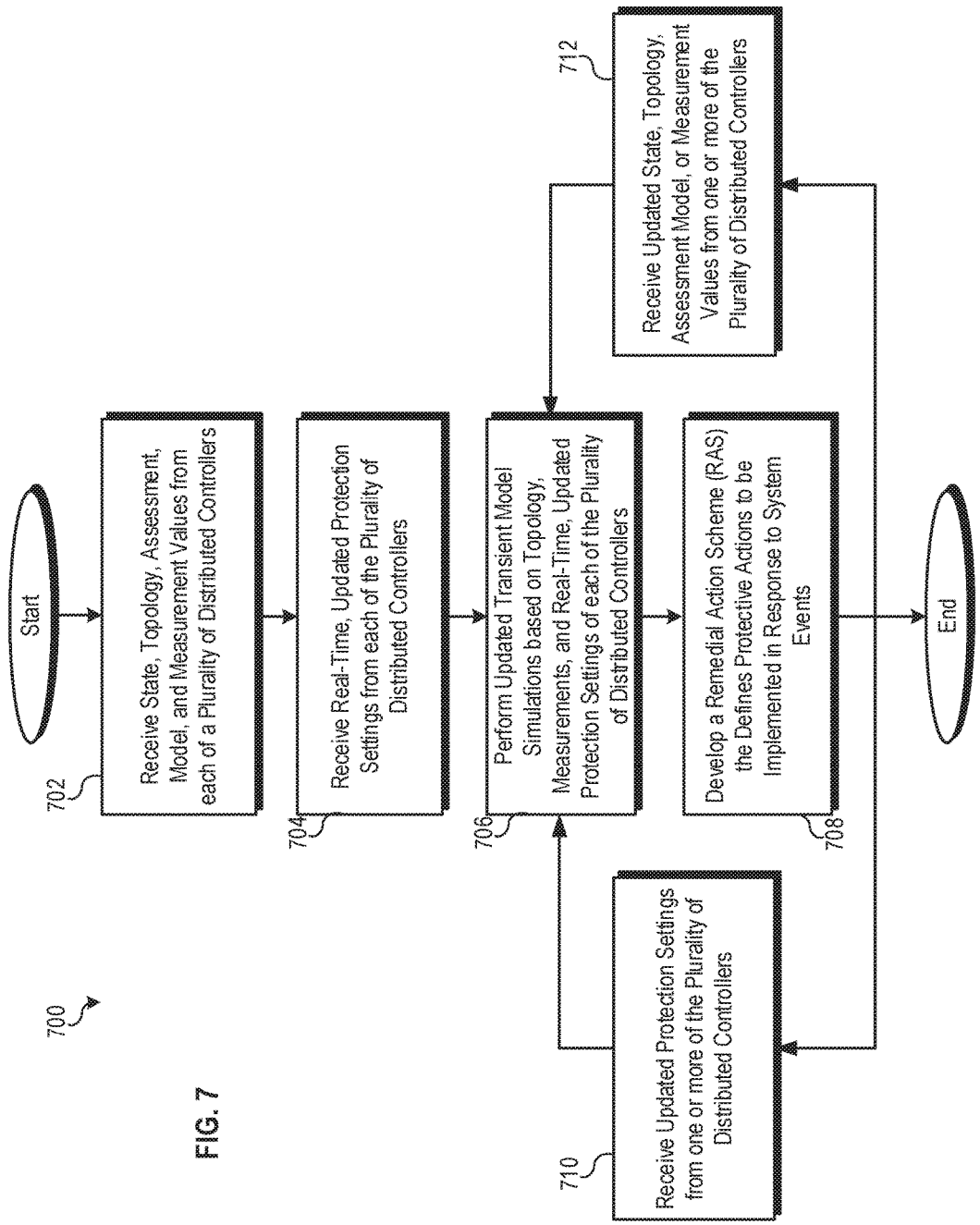
FIG. 7 illustrates one method of a coordination controller maintaining a dynamic remedial action scheme using updated transient simulation models based on real-time protection settings of a plurality of distributed controllers.

FIG. 7 illustrates one method 700 of a coordination controller maintaining a dynamic remedial action scheme using updated transient simulation models based on real-time protection settings of a plurality of distributed controllers. The coordination controller may receive state, topology, assessment model information, measurement values, and the like from each of a plurality of distributed controllers, at 702. The coordination controller may also receive, real-time updated protection settings from each of the plurality of distributed controllers, at 704. Steps 702 and 704 need not happen sequentially, on the same periodic basis, or the illustrated order.

The coordination controller may then perform (e.g., calculate or process) updated transient model simulation based on the data received from the plurality of distributed controllers—including updated measurement values and/or protection settings of one or more of the distributed controllers, at 706. The coordination controller may use the results of the transient model simulation to develop a RAS that defines one or more protective actions to be executed in response to system events, at 708.

The coordination controller may update the transient model simulations, at 706, based on the reception of updated, real-time protection settings from one or more of the plurality of distributed controllers, at 710, and/or based on the reception of updated state, topology, assessment model information, measurement values, etc. from one or more of the plurality of distributed controllers, at 712. Based on the new transient model simulations, at 706, the RAS may be dynamically updated to reflect the changes. Specifically, the RAS may be dynamically updated to reflect changes in the protection settings of one or more of the distributed controllers in real-time or close thereto. The "real-time" adjustments may be based on the specific application and may be close to instantaneous, on a periodic basis (e.g., every second, minute, hour, day, week, month, etc.), or only when an actual change to a protection setting is made.

The examples and illustrations provided relate to specific embodiments and implementations of a few of the many possible variations. It is understood that the disclosure is not limited to the precise configurations and components disclosed herein. Accordingly, many changes may be made to the details of the above-described embodiments without departing from the underlying principles of this disclosure. The scope of the present invention should, therefore, be determined in the context of the possible claims that are supportable by this disclosure, including the following:

What is claimed is:

1. An electrical power system with distributed coordinated control per a dynamic remedial action scheme, comprising:
   a communication network to facilitate communication between distributed controllers and at least one coordination controller;
   a plurality of distributed controllers, at least some of which monitor portions of the electrical power system via electrical measurements and implement protective control operations according to protection settings, wherein at least one of the plurality of distributed controllers implements protective control operations based on adaptive protection settings that are dynamically modified based on electrical measurements of the electric power system;
   a coordination controller to coordinate higher-level protective operations via the plurality of distributed controllers, the coordination controller comprising:
      a topology module to receive topology information from at least one of the distributed controllers via the communications network;
      an assessment module to receive electrical measurement data from at least one of the plurality of distributed controllers via the communications network;
      a protection settings module to receive updated protection settings from at least one distributed controllers with adaptive protection settings, via the communications network, wherein the updated protection settings comprise at least one setting in which at least one of the plurality of distributed controllers protects at least portions of the electrical power system via a discontinuous control action;
      a remedial action scheme (RAS) module to define a set of protective control operations to be implemented by distributed controllers in response to a corresponding set of defined system conditions.

2. The electrical power system of claim 1, wherein the RAS module dynamically modifies the set of protective control operations to be implemented in response to the corresponding set of defined system conditions each time the protection settings module receives updated protection settings.

3. The electrical power system of claim 1, wherein the protection settings module receives the updated protection settings from the at least one distributed controller in real time.

4. The electrical power system of claim 1, wherein each of the plurality of distributed controllers comprises an intelligent electronic device with a processor, memory, and at least one sensor component to receive electrical measurements from the electrical power system and independently determine protective control operations to be implemented based on individual protection settings.

5. The electrical power system of claim 1, wherein the coordination controller receives information from at least one distributed controller outside of a region protected by the coordination controller for the RAS module to define the set of protective control operations to be implemented by distributed controllers within the region protected by the coordination controller in response to the corresponding set of defined system conditions.

6. The electrical power system of claim 5, wherein at least one of the system conditions in the set of defined system conditions is a system condition external to the region protected by the coordinate controller.

7. The electrical power system of claim 5, wherein the coordination controller receives information from the at least one distributed controller outside of the region protected by the coordination controller from a multi-regional coordination controller.

8. The electrical power system of claim 1, wherein the coordination controller further comprises a component model module to perform a transient model simulation based on the received topology information, electrical measurement data, and the protection settings, and
   wherein the RAS module uses results of the transient model simulation to define the set of protective control operations to be implemented by distributed controllers in response to the corresponding set of defined system conditions.

9. The electrical power system of claim 8, wherein the component model module of the coordination controller is configured to model a response of at least one of: an instantaneous overcurrent element; an inverse-time overcurrent element; a thermal element; a reactive power control element; a distance element; a current differential element; a load encroachment element; an impedance characteristic control element; an undervoltage element; a directional element; a negative sequence current element; a loss of excitation element; a negative sequence voltage element; an overvoltage element; a ground fault element; a high-impedance fault element; an underfrequency element; and an overfrequency element.

10. The electrical power system of claim 8, wherein the component model of the coordination controller is configured to model a response of one a reactive power controller, a capacitor bank controller, a transformer tap changing controller, a generator over-excitation limit controller, a governor controller, a power system stabilizer controller, a shunt reactor controller, a DC line controller, and an inverter controller.

11. A method for generating a dynamic remedial action scheme for distributed coordinated control to an electrical power system, comprising:
receiving, by a coordination controller, topology information from one or more of a plurality of distributed controllers,
wherein the coordination controller is configured to coordinate protection of the electrical power system via the plurality of distributed controllers, and wherein at least one of the plurality of distributed controllers is configured to implement a protective control operation;
receiving, by the coordination controller, electric power measurement data from one or more of the plurality of distributed controllers;
conducting model simulations of the electrical power system based on the topology information, electric power measurement data, and initial protection settings for each of the plurality of distributed controllers;
defining a remedial action scheme (RAS) for at least a portion of the electrical power system that includes a first protective control operation to be implemented by one of the plurality of distributed controllers in response to a defined event;
receiving, by the coordinate controller, an updated protection setting from at least one of the plurality of distributed controllers, wherein the updated protection setting comprises a setting in which at least one of the plurality of distributed controllers protects at least portions of the electrical power system via a discontinuous control action; and
dynamically updating the RAS to modify the first protective control operation based on the updated protection setting.

12. The method of claim 11, wherein the coordination controller is configured to provide distributed coordinate control to a first of a plurality of regions of the electrical power system, and wherein each of the plurality of distributed controllers is within the first region.

13. The method of claim 11, wherein the coordination controller is configured to provide distributed coordinate control to a first of a plurality of regions of the electrical power system, and wherein at least one of the plurality of distributed controllers is outside of the first region.

14. The method of claim 13, wherein protective control operations of the RAS are to be implemented by distributed controllers within the first region.

15. The method of claim 11, wherein receiving the updated protection setting from at least one of the plurality of distributed controllers comprises receiving real-time updates of protection settings for at least some of the distributed controllers.

16. The method of claim 11, further comprising:
adjusting the protection settings of at least one of the distributed controllers in response to one of the topology information and the electric power measurement data.

17. An intelligent electronic device as a wide-area controller to provide coordinated protection to an electrical power delivery system, comprising:
a processor;
at least one communications network interface to
receive electrical measurement data from a plurality of protective intelligent electronic device (protective IEDs) within the electrical power delivery system,
receive real-time updated protection settings from at least one of the plurality of protective IEDs that uses adaptive protection settings, wherein the real-time updated protection settings comprise at least one setting in which at least one of the plurality of IEDs protects at least portions of the electrical power delivery system via a discontinuous control action, and
transmit protective control operation commands to at least one of the protective IEDs;
a component modeling system to use the processor to repeatedly update a transient model simulation of at least a portion of the electrical power delivery system in response to receiving (1) updated electrical measurement data or (2) receiving real-time updated protection settings from one of the plurality of protective IEDs; and
a remedial action scheme (RAS) system to use the processor to dynamically modify a RAS based on a most recent updated transient model simulation to redefine a set of protective control operations to be implemented by at least one of the protective IEDs in response to a corresponding set of defined conditions.

18. The intelligent electronic device of claim 17, wherein the RAS system dynamicall modifies the set of protective control operations to be implemented in response to the corresponding set of defined conditions each time the component modeling system receives updated protection settings.

19. The intelligent electronic device of claim 17, wherein at least one of the condition! in the set of defined conditions comprises one of an equipment status, a breaker status, a voltage measurement, a current measurement, and a frequency measurement.

20. The intelligent electronic device of claim 17, wherein the component modeling system updates the transient model simulation based on information from one or more of the protective IEDs that includes topology information, electrical measurement data, and the protection settings.

* * * * *